(12) United States Patent
Qualls, Jr. et al.

(10) Patent No.: US 6,539,657 B1
(45) Date of Patent: Apr. 1, 2003

(54) UNIVERSAL EDGE-LIT EXIT SIGN (75) Inventors: Nathan C. Qualls, Jr., Wilmington, NC (US); Jason J. Davis, Salisbury, MD (US)

(73) Assignee: Genlyte Thomas Group LLC, Louisville, KY (US)

( * ) Notice: Subject to any disclaimer, the term of this patent is extended or adjusted under 35 U.S.C. 154(b) by 17 days.

(21) Appl. No.: 09/851,646

(22) Filed: May 9, 2001

(51) Int. Cl.⁷ .............................................. G09F 13/18
(52) U.S. Cl. ...................................................... 40/546
(58) Field of Search .......................... 40/564, 570, 572, 40/546

(56) References Cited

U.S. PATENT DOCUMENTS

| | | |
|---|---|---|
| 1,759,782 A | 5/1930 | Fox |
| 1,809,243 A | 6/1931 | Kirk |
| 2,299,672 A | 10/1942 | Willer |
| 2,994,148 A | 8/1961 | Endelson |
| 2,994,149 A | 8/1961 | Endelson |
| 3,478,455 A | 11/1969 | Fremont |
| 3,665,626 A | 5/1972 | Lund |
| 3,916,404 A | 10/1975 | Gouge |
| 3,931,689 A | 1/1976 | Shine |
| 4,271,621 A | 6/1981 | Garcia et al. |
| 4,355,479 A | 10/1982 | Thornton |
| 4,385,343 A | 5/1983 | Plumly |
| 4,561,203 A | 12/1985 | MacDonald, Jr. et al. |
| 4,918,578 A | 4/1990 | Thompson |
| 5,018,290 A * | 5/1991 | Kozek et al. ................ 362/240 |
| 5,022,627 A | 6/1991 | Beghelli |
| 5,047,907 A * | 9/1991 | Hawkins ...................... 362/311 |
| 5,105,568 A | 4/1992 | Branning |
| 5,247,756 A | 9/1993 | Johnstone |
| 5,428,912 A | 7/1995 | Grondal et al. |
| 5,526,251 A | 6/1996 | Andre et al. |
| 5,950,340 A * | 9/1999 | Woo ............................ 362/235 |
| 5,964,051 A | 10/1999 | Loeber et al. |
| 6,142,648 A | 11/2000 | Logan et al. |

* cited by examiner

Primary Examiner—S. Joseph Morano
Assistant Examiner—Robert J. McCarry, Jr.
(74) Attorney, Agent, or Firm—John F. Salazar; Middleton Reutlinger (57) ABSTRACT

A multi-position edgelit sign is described wherein a lens is removably affixable to a mounting housing assembly. A LED lightbar is mountable at different positions within the mounting housing assembly in order to properly illuminate the lens and may be mounted in various positions such that the lens may be affixed to the mounting housing assembly at different angles. Further, removable inserts are provided such that the signage on the lens may be adaptable to field specified characteristics thereby not requiring preprinted signs to be manufactured depending on these characteristics.

32 Claims, 13 Drawing Sheets

UNIVERSAL EDGE-LIT EXIT SIGN

BACKGROUND OF THE INVENTION

1. Field of the Invention

The present invention relates to lighted signs and particularly to multi-position mount edge-lit exit signs with LED illumination.

2. Discussion of the Prior Art

Exit sign and corresponding mounting and lighting have pre-occupied the lighting and signage industry for some time. One goal of the industry is to create a exit sign or other type of signage which is clearly visible in varying light while also being readily installable. However, most prior art signage of this nature are mountable in only one direction and therefore require complex installation while also mandating the user have a pre-existing knowledge as to location and direction of the exits so that directional indicators which are located on the signage may be properly placed thereon. The prior art therefore is lacking in a readily adaptable edgelit sign which is mountable on either a top wall or side wall mount and which has field installable directional indicators.

SUMMARY OF THE INVENTION

It is therefore a desired object of the present invention to create an edgelit sign which is multi-positional and as a result of which has the allowance for field installable directional indicators.

It is a further object of the present invention to provide an edgelit exit sign which is compact and attractive and easy to install which includes customer installable directional chevrons.

It is an additional object of the present invention to provide a multi-position mount sign which may be mounted on various walls or ceilings and at varying angles such that the sign is properly illuminated and such that the directional indicators may be modified upon installation.

A further object of the present invention is to provide an edgelit exit sign which has a mounting housing assembly affixed to a mounting plate, the mounting housing assembly having a beveled edge which mates with the beveled edge of a lens housing assembly. The lens housing assembly and the mounting housing assembly are removably affixed together such that depending below the lens housing assembly is the signage lense which is illuminated by an LED lightbar contained within the mounting housing assembly. The LED lightbar of the present invention is mounted in brackets and retained in place within the mounting housing assembly such that the LED contained thereon properly illuminates the signage.

It is an even further object of the present invention to provide an edgelit exit sign wherein the directional chevrons are customer installable such that independent of the actual environment. which they are installed, the customer or installer may directly install the proper indicators without having to pre-order specific screenings or other information on the sign itself.

An even further object of the present invention is to provide sliding chevrons which are maintained within the lens and which are customer removable depending on the proper environment within which the signage is installed.

An additional object of the present invention is for an edgelit sign, comprising a front lens, a back lens, a gap therebetween, and at least one insert removably received within said gap, said front lens and back lens retained together in adjacent relationship.

All of the above outlined objections are to be understood as exemplary only and many more objectives of the invention may be gleened from the disclosure herein. Therefore, no limiting interpretation of the objectives noted are to be understood without further reading of the entire specification and drawings included herewith.

BRIEF DESCRIPTION OF THE DRAWINGS

A better understanding of the invention will be had upon reference to the following description in conjunction with the accompanying drawings in which like numerals are referred to like parts and wherein:

FIG. 8a is a side view of the lens and LED lightbar of an alternative lightbar embodiment;

FIG. 8b is a perspective view of the LED lightbar of the FIG. 8a;

FIG. 9a is a side view of the LED lightbar and lens of an alternative lightbar embodiment;

FIG. 9b is a perspective of the LED lightbar of FIG. 9a;

FIG. 10b is a side sectional view of the edgelit sign of FIG. 10a;

FIG. 11a is a side view of the edgelit sign of the present invention installed at 90 degrees as is displayed in FIG. 10a;

FIG. 11b is a side sectional view of the edgelit sign of FIG. 11a;

DETAILED DESCRIPTION OF THE PREFERRED EMBODIMENTS

Figure 1:
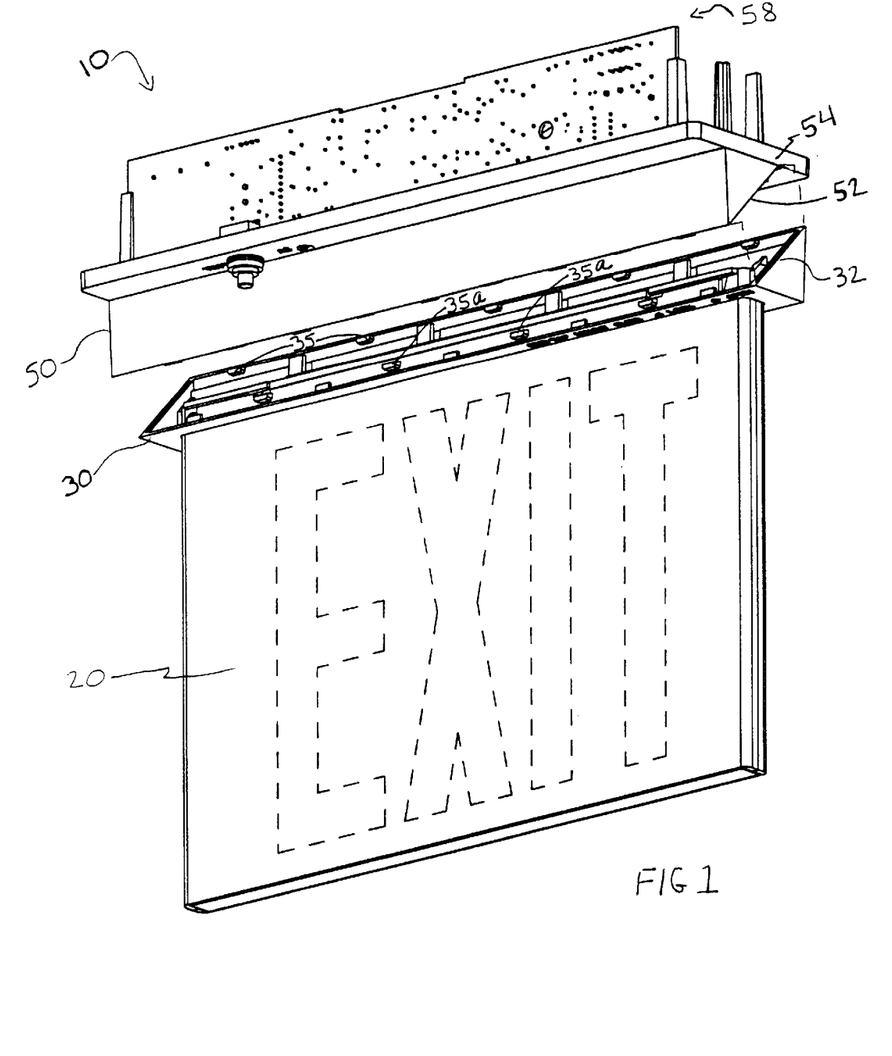
FIG. 1 is a perspective view of the multi-position mount edgelit sign of the present invention.

The multi-positioned mount edge-lit signage 10 of the present invention is depicted in FIG. 1 and the following figures. As shown therein, the edgelit sign 10 is comprised of a mounting housing assembly 50 which has electronic assemblies 58 affixed thereto and which attaches directly to the lens housing assembly 30. The lens housing assembly 30 retains the lens or sign 20 through an opening formed therein such that the sign or lens 20 depends therebelow as depicted in the various figures.

One element of the present invention is the ability for the mounting housing assembly 50 to be connected to the lens housing assembly 30 in multiple positions. As exemplified in FIGS. 10b and 11b, the sign or lens 20 which is retained within lens housing assembly 30 may be at varying angles with mounting plate 54, depending upon the beveled angled edge 52 and 32 of the mounting housing assembly 50 and the lens housing assembly 30. As exemplified in FIG. 10b, the mounting plate 54 allows a side wall mount of the lens 20 as shown. Alternatively, for a top mount position, lens or sign 20 depends directly downward from the mounting plate 54 such as, for example, in a ceiling mount position.

As is evident from FIG. 1 however, many different angles and mounting positions are available. These varying angles may be implemented in the present design such that the beveled edge 52 and 32 for the mounting assembly and lens housing assembly may be angularly adjusted.

As is shown therein, the edgelit sign 10 of the present invention has electronic assembly element 58 attached to the mounting housing assembly 50 wherein the mounting plate 54 and the beveled edge 52 for connection to the lens assembly is located. Affixed thereto is lens housing assembly 30 and lens 20 which has the necessary signage thereon which will be illuminated by the electronic assembly 58 and the LED lightbar 34, depicted in FIG. 2.

Figure 2:
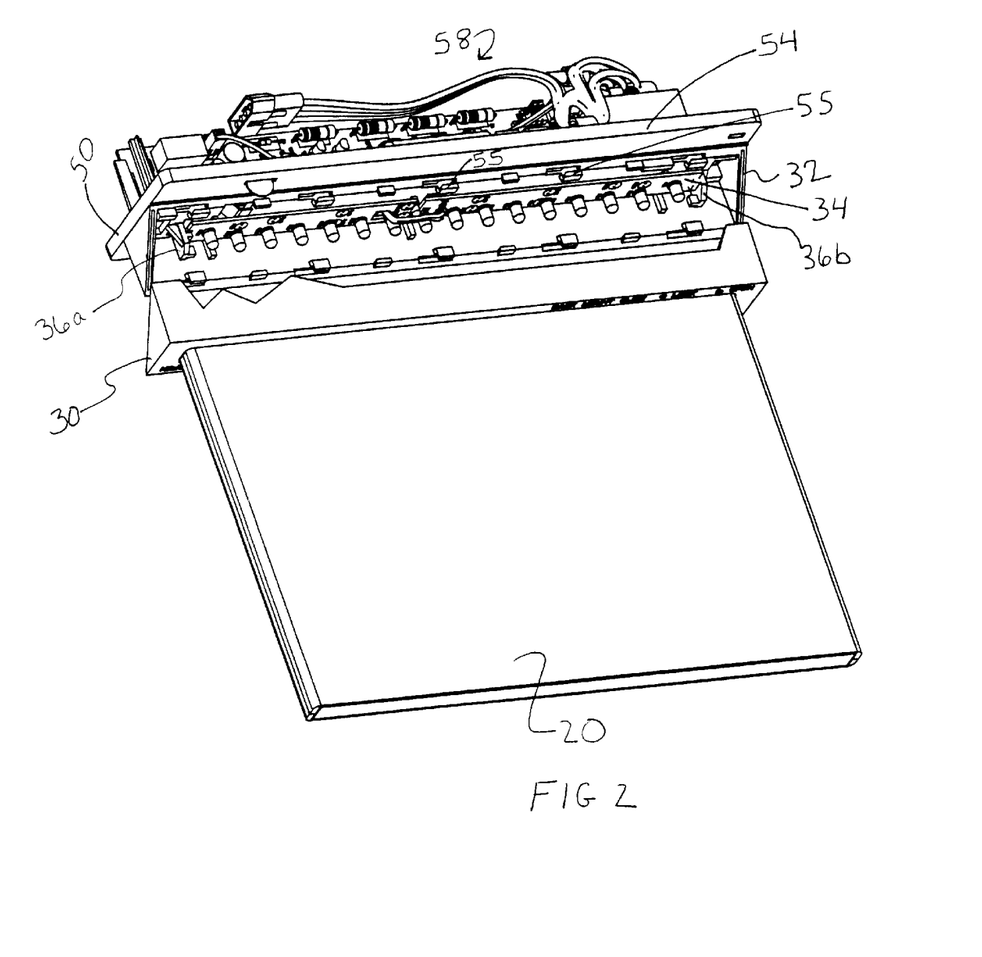
FIG. 2 is a lower perspective view of the edgelit sign of FIG. 1 wherein the mounting housing assembly and lense housing assembly are separated.

As shown in FIG. 2, the electronic assembly 58 powers the LED lightbar 34 which is retained within the mounting housing assembly 50. The purpose of the LED lightbar 34 depicted in the figures is to illuminate the lens 20 which is placed in an adjacent relationship to the individual LED's 35 which are shown in the figures. By placing the individual LED's 35 from the LED lightbar 34 at the top end or edge of the lens 20, the entirety of the lens 20 may be properly illuminated which will effectively illuminate the entirety of the sign. As can be seen from the figures, installation of the lens housing assembly 30 and mounting housing assembly 50 in proper orientation places the LED's 35 in an adjacent relationship with the top edge of the lens 20, particularly as can be seen from FIGS. 10b and 11b.

Also as is shown in FIG. 2, the LED lightbar 34 may be retained in either a downwardly facing position, in relation to the mounting plate 54, or in an angled position, by the two position mounting brackets 36a and 36b. Preferably, the two position mounting brackets 36a and 36b will retain the LED lightbar 34 in proper relationship with the lens 20 in such a manner that regardless of the angle of beveled edge 52 and 32, the LED lightbar 34 is properly placed along an edge of lens 20 to properly illuminate the entirety of the lens. As shown in FIG. 2, the LED lightbar 34 is installed in the downward facing position so that the lens 20 depends directly downward from the mounting housing assembly 50 in an exemplary installation for ceiling mount position. Retaining clips 55 on the mounting housing assembly may work in conjunction with the retaining clips 35 located on the lens housing assembly such that the two assemblies may be snap fitted together thereby allowing tool-less entry and separation thereof.

It is desirable for installation of the present invention such that the LED lightbar 34 may be properly aligned with the lens 20 depending upon the mounting specifics required for the particular installation. While many types of installations are found, the most common are either ceiling mounts or side wall mount positions. Thus, it may be preferable, although not required, to have the two position mounting brackets 36a and 36b structured such that the LED lightbar 34 may be held in either a parallel plane relationship with the mounting plate 54 or in a perpendicular relationship thereof. Of course, varying angles may be associated, as defined above, depending upon the beveled edge and angular displacement required for the lens 20 in relationship to the mounting housing assembly 50. Further, the detachable connection of the mounting housing assembly and the lens housing assembly as depicted herein may be a significant number of alternative connections such that they may be either removably attached and properly configured by the installer or end user, or potentially the housings 30 and 50 may be a single unit wherein the LED lightbar is readily accessible and removable. These alternative design constructions are felt to be taught within the disclosure hereof and no unnecessary limitations are to be interpreted with the specific constructs of the mounting brackets or beveled edges described herein.

Figure 3:
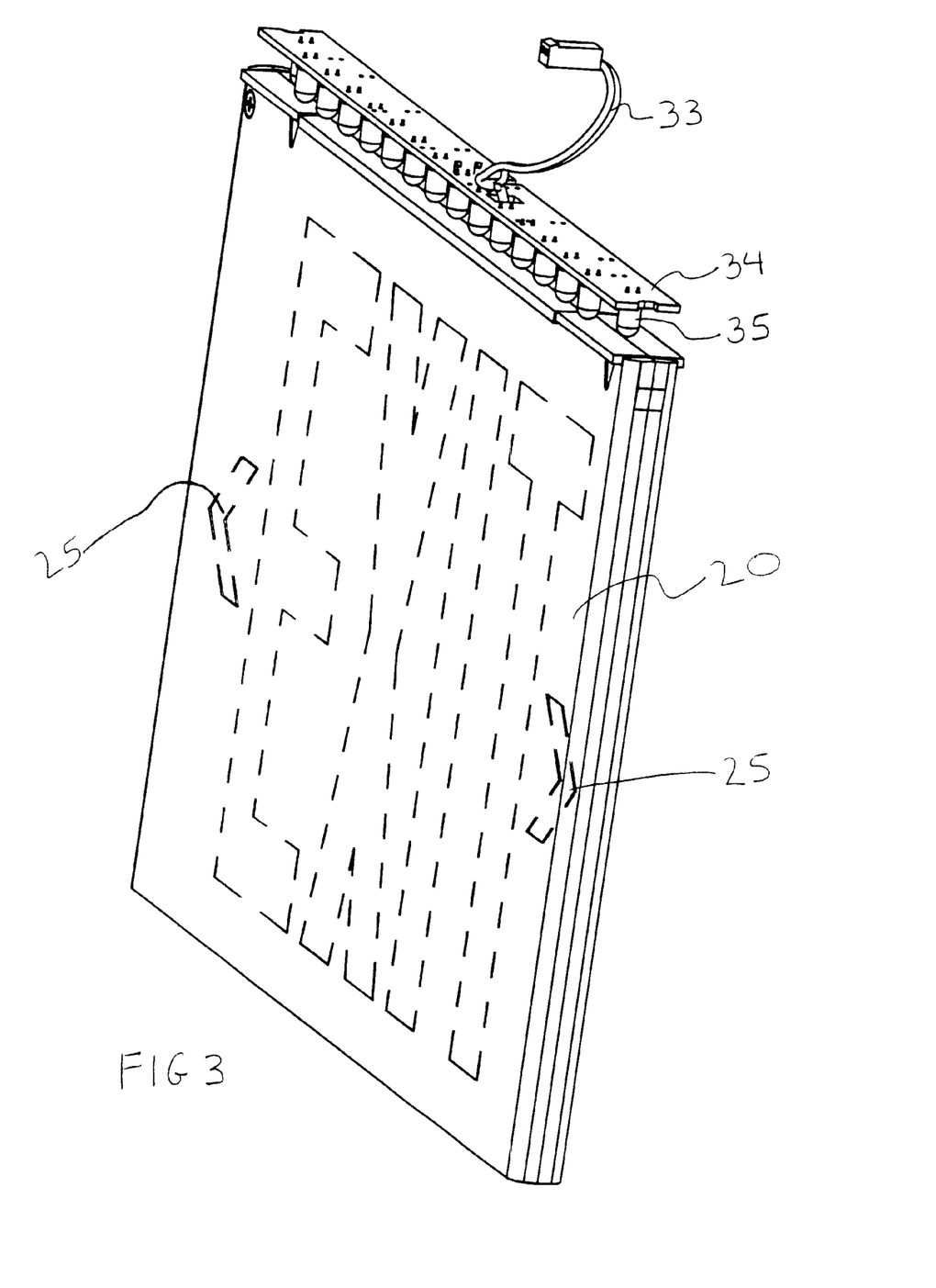
FIG. 3 is a side perspective view of the lens and LED lightbar of the present invention.

As depicted in FIG. 3, the edgelit sign 10 of the present invention is shown specifically with the relationship of lens 20 and the LED lightbar 34. The plurality of LED's 35 on lightbar 34 are placed in an adjacent relationship with the top edge of the lens 20. As previously indicated, the lens 20 may be sufficiently illuminated by the LED lightbar 34 such that the entirety of the lens and message on the signage is visible. Also depicted in FIG. 3 are the directional chevrons 25 which may be positioned in either direction depending on the final installation position of the sign. Thus, depending upon end user specifics, insertable chevrons are provided in order to properly indicate the direction of the exit, as exemplified in the present invention. Thus, the design does not require that the signage on the lens 20 be tailored for the particular installation. The installer or end user may thus alter the sign depending upon the final installation parameters.

As depicted in FIG. 3, the LED lightbar 34 is connected to the electronics assembly 58 through the power cord 33. Sufficient current is therefore provided to the LED lightbar 34 such that the LED's 35 illuminate the sign 20. By providing a power cord 33 to connect the LED lightbar 34 to the electronics assembly 58, the LED lightbar may be positioned in various locations within the mounting housing assembly in order to maintain the adjacent relationship between the LED lightbar and the lens 20.

Figure 4:
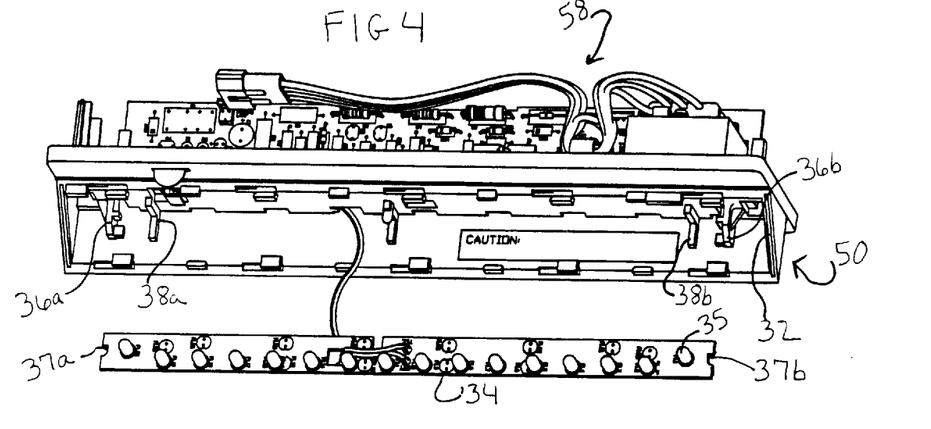
FIG. 4 is a close up perspective of the mounting housing assembly of FIG. 1.
Figure 5:
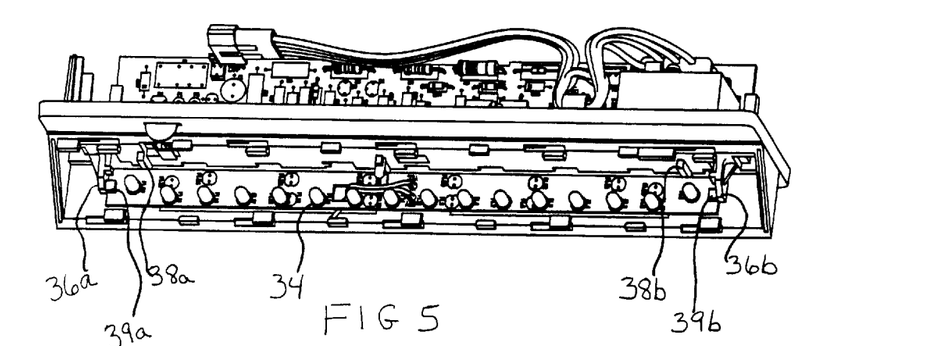
FIG. 5 is a close up perspective of the mounting housing assembly of FIG. 4 with the LED lightbar installed.

As depicted in both FIGS. 4 and 5, the LED lightbar 34 is mounted in the mounting housing assembly 50 in a perpendicular relationship to the mounting plate 54. The two position mounting brackets 36a and 36b retain the lens and LED lightbar in proper relationship to the mounting plate 54. As can be seen in both FIG. 4 and FIG. 5, the lightbar may have mounting recesses 37a and 37b such that tabs 39a and 39b may firmly retain the lightbar in proper position. Additionally, L-shaped support members 38a and 38b are provided to adequately support the lightbar within the assembly.

Figure 10A:
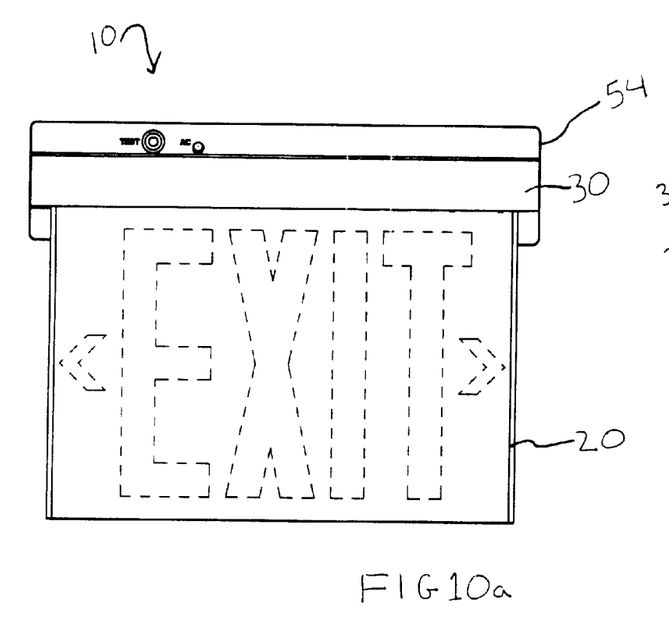
FIG. 10a is a front view of the multi-position mount edgelit sign of FIG. 1.
Figure 10B:
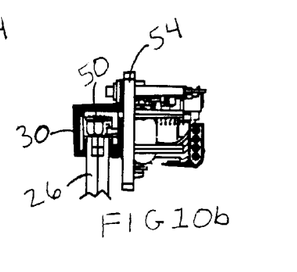

In the example depicted in FIGS. 4 and 5, the lens will be arranged such as shown in FIG. 10a and FIG. 10b such that the lens 20 depends below the lens housing assembly 30 but may be substantially parallel to the mounting plate 54 or the mounting surface. Thus, upon installation the multi-position mount edgelit sign 10 of the present invention may be mounted on a side wall, the installer may properly place the LED lightbar in the side mounting position affixing both the mounting housing assembly and the lens housing assembly 50, 30 in proper relationship as previously described.

Figure 6:
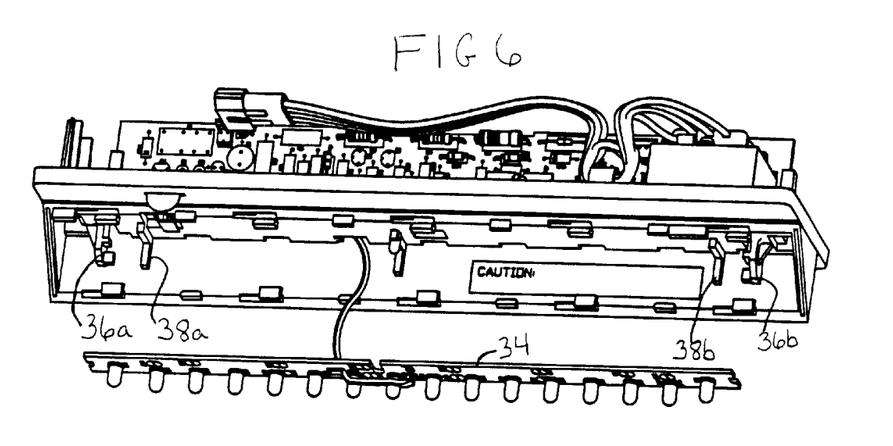
FIG. 6 is a close up perspective of the mounting housing assembly and LED lightbar of the present invention.
Figure 7:
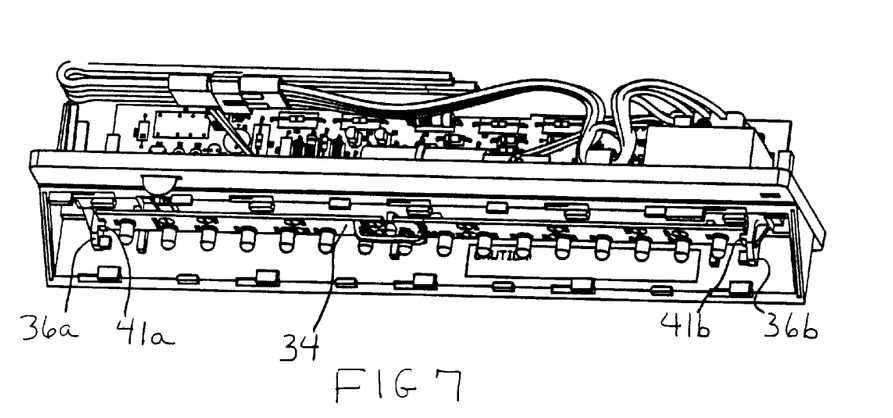
FIG. 7 is a close up perspective of the mounting housing assembly of FIG. 6 with the LED lightbar installed.
Figure 11A:
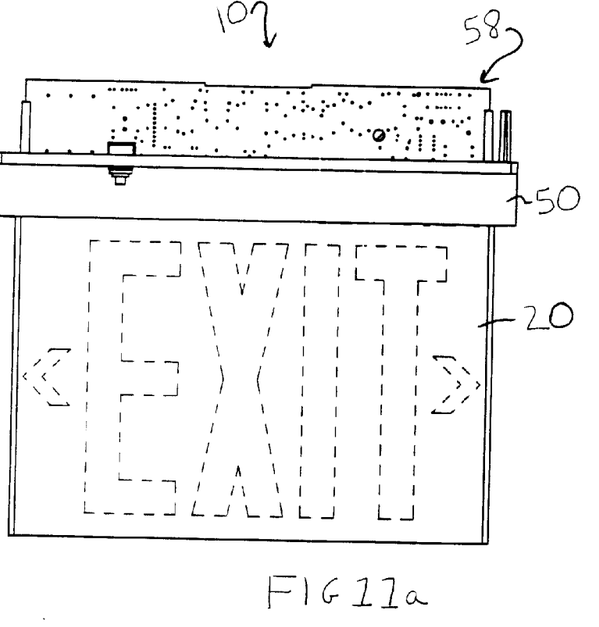
Figure 11B:
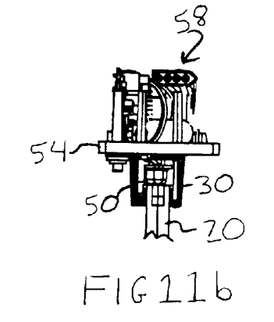

Alternatively, as shown in FIG. 6 and in FIG. 7, the LED lightbar 34 may be retained within the mounting brackets 36a and 36b such that the LED lightbar is substantially perpendicular to the mounting plate 54, as depicted in FIG. 11a and FIG. 11b. Thus, the sign or lens 20 depends directly below the mounting plate 54 and mounting surface in a exemplary perpendicular relationship therewith. As depicted in this example, a ceiling mount type installation may be required thus allowing the sign or lens 20 to depend directly below the ceiling. However, as noted herein various positions for mounting the lens 20 of the present invention is available. Thus, alternative mounting brackets 36a and 36b may be combined with alternative beveled edges 52 and 32 in order to provide the lens at the required or desired angle with respect to mounting plate 54.

The multi-position edgelit sign of the present invention has a mounting housing assembly which has a substantially rectangular front surface and a first and second substantially triangular side surface; the lens housing assembly has a rectangular front surface and a substantially triangular first and second side surface, the beveled edge on the mounting housing assembly contacting the beveled edge on the lens housing assembly to removably attach the lens housing assembly to the mounting housing assembly as shown.

Figures 8A, 8B:
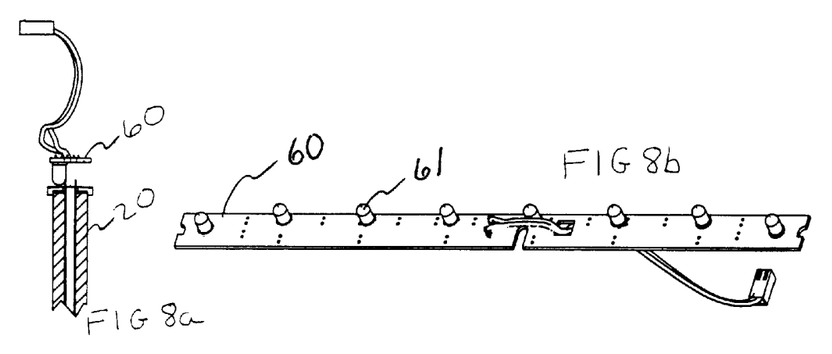

In FIGS. 8a and 8b, an alternative LED lightbar 60 of the present invention is shown wherein only one side of the lens 20 is illuminated. Thus, LED's 61 on the LED lightbar 60 are placed only along a singular row or side of the LED lightbar in order that the one side of the lens 20 is illuminated.

Figures 9A, 9B:
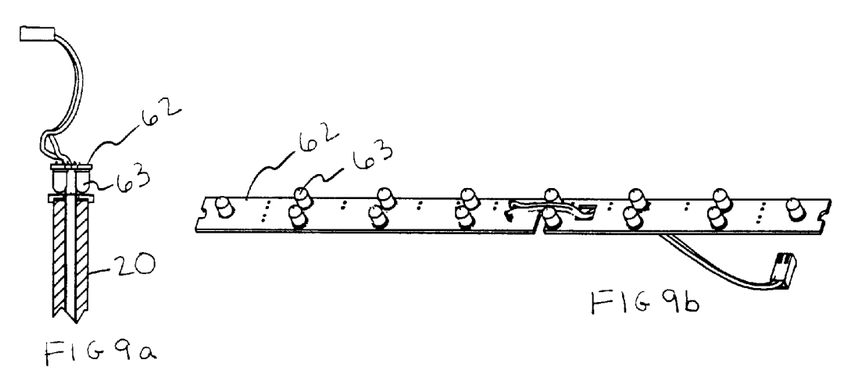

Alternatively, as shown in FIGS. 9a and 9b, a plurality of LED's 63 are placed in side by side or adjacent relationship on the LED lightbar 62. Thus, both the front and the back of the lens 20 may be illuminated by the plurality of LED's 63 placed on lightbar 62. This may be desirable when the lens 20 of the present invention is desired to be illuminated from either side such that indicia located thereon is visible on both the front and the back. The alternative embodiment of FIG. 8a may be desirable when only a single side is visible and needs to be illuminated.

As depicted in FIGS. 10a, 10b, 11a, and 11b, a number of positions for mounting the lens 20 utilized in the present invention are available. Mounting plate 54 is placed adjacent to the surface upon which the multi-position mount edgelit signage 10 of the present invention is to be securely affixed. As indicated, for exemplary purposes herein, the lens 20 of the present invention is depicted as being either parallel to or perpendicular to the mounting plate 54. Thus, the lens 20 is securely affixed within lens housing assembly 30 and the lens housing assembly 30 is then snapped fitted against the mounting housing assembly 50. By removably attaching the lens housing assembly 30 to the mounting housing assembly 50, the lens 20 is effectively affixed to the mounting plate 54 and corresponding electronics assembly 58. The lens in such a construction will thus depend in parallel fashion with the mounting plate 54 as is depicted in FIG. 10b. An application for the mounting example shown in FIG. 10b would thus be overhanging a door or other similar exit or within a hallway where ceilings are too high for adequate mounting. Thus, the front surface of the lens 20 will have appropriate indicia thereon for viewing which will be adequately illuminated by plurality of LED's maintained within the mounting housing assembly 50.

Alternatively, where the signage or lens 20 of the present invention is to be installed directly from a ceiling position, mounting plate 54 will abut directly or be recessed within the ceiling, not shown, such that the lens 20 may be perpendicular to the mounting plate 54. As shown in FIG. 11a, the signage 20 with proper indicia located thereon, may be clearly visible and, the design of the present invention is such that regardless of the position for mounting plate 54, an adequate connection between the LED lightbar, lens housing assembly 30, mounting housing assembly 50, and mounting plate 54 may be provided. Thus, if alternative angles besides those of exemplary construction depicted herein are required, varying angles of beveled edges 52 and 32 may be provided.

Figure 12:
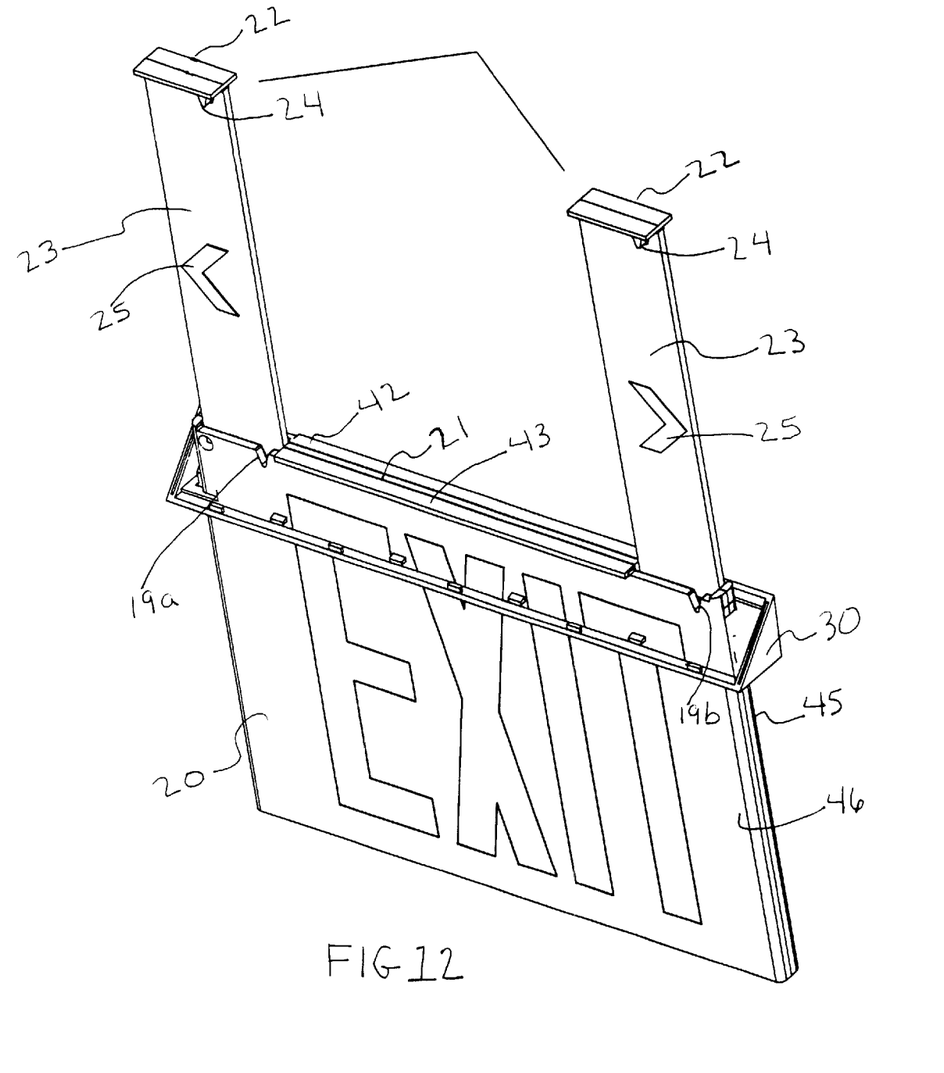
FIG. 12 is an upper perspective view of the lens assembly with chevron inserts of the present invention.

As described herein, the multi-position mount edgelit signage 10 of the present invention allows the installer or end user to place the lens or sign 20 at the desired angle in relation to the mounting plate 54. In addition to this end user installable feature, it may be desirable to provide various and replaceable indicia within the lens 20. For example, as depicted herein, exit signs may be utilized for a proper illumination during normal operation or during emergency situations. In such installation however, the directional chevrons 25 which indicate the location of the nearest exit will be different depending on the actual location of installation. In such a situation, it is therefore desirable to have end user installable inserts to indicate where the local exit is located. In such installation, insertable signage such as the chevron inserts 23, depicted in FIG. 12, may be utilized. As shown in FIG. 12, the lens 20 may be provided with a front lens 46 and a back lens 45 which therefore has a gap 21 therebetween. Indicia or other signage may be placed on either or both the front lens 46 and back lens 45 such that either side is visible. The lens may be constructed of injection molded PMMA which is optically clear and has a high light transmittance. Such use of acrylic lens with textured tops may be utilized in order to properly diffuse the light and the front and the back lens 46 and 45 may be ultrasonically welded together leaving gap 21 therebetween. Both of the lens halves 46 and 45 may be imprinted with indicia thereon in using known silkscreened operation. Various colors and constructions may be utilized in order to properly place indicia on the lens. The lens may have a gap 21 which may be approximately 0.160 inch in width in order to accept removable indicia inserts therein. It may also be desirable such that the bottom edge of the lens 20 may have a removable tape or reflective paint placed thereon in order to reflect light up into the lens which is emitted by the LED lightbar at the top edge.

As shown in FIG. 12, the lens 20 of the present invention is utilized as an exit sign wherein chevron inserts 23 are installed. As shown therein, chevron inserts 23 have chevron indicators 25 painted thereon such that upon installation, the installer may direct the chevron inserts to the proper exit. Chevron inserts are designed such that they have a shoulder portion 22 and a depending planar portion. The depending planar portion is inserted within the gap 21 and retained therein.

The front and back lens elements 46 and 45 have a top edge 43 and 42 which extends slightly outward from the planar surface of either the front and back lens 46 and 45. Also as shown in FIG. 1 and the other as installed figures, ledges 42 and 43 help retain the assembled lens within the lens housing assembly 30 by allowing the ledges 42 and 43 to contact the interior wall of the lens housing assembly. In other words the lens housing assembly has a long aperture formed therein through which extends the planar portion of the lens. The ledges extend outward to contact the interior edges of the aperature and retain the lens in position as shown in FIG. 1.

As shown in FIG. 12, the chevron inserts are placed on either side of the lens 20 and are inserted therein to indicate the proper direction for example, of an exit. The chevron inserts 23 are constructed of similar injection molded acrylic and have appropriate silkscreened or imprinted indicia thereon, in this example chevrons 25. The chevron inserts 23 have shoulders 22 formed at the top edge in order to correspondingly mate with the ledges 42 and 43 of the lens 20. The chevrons further have notches 24 which depend downwardly from shoulder 22 and which are received within a recess 19a and 19b of the front and back lenss 46 and 45. Notches 24 and recesses 19a and 19b may be placed on either side of the lens 20 or may be only on a singular side depending upon the construction, position, and preferable direction of the chevron inserts.

The ledges 42 and 43 work in conjunction with shoulders 22 such that after insertion of the chevron insert 23 into the gap 21 along either side of the lens 20, the insert 23 remains in place and may not slide within gap 21.

As shown in FIG. 12, the lens 20 of the present invention may be configured as field specified left or right. The unit depicted therein may also be configured with left, right, both or no chevrons inserted, depending upon the specific requirements of the point at installation. The chevron inserts 23 are retained within gap 21 by mating of shoulders 22 and ledges 42 and 43. Additionally, a pin or other screw type element may be inserted through the front or back lens 46, 45 in order to firmly retain the chevron insert 23 into place. However, such retaining or holding mechanism is not necessarily required as the shoulders 22 in combination with notch 24 and recess 19a and 19b may also retain the insert properly. However, if a secure affixation of the chevron insert 23 within gap 21 is desired which prevents removal of the insert prior to a disassembly step, such retaining mechanisms may be utilized.

Figure 13:
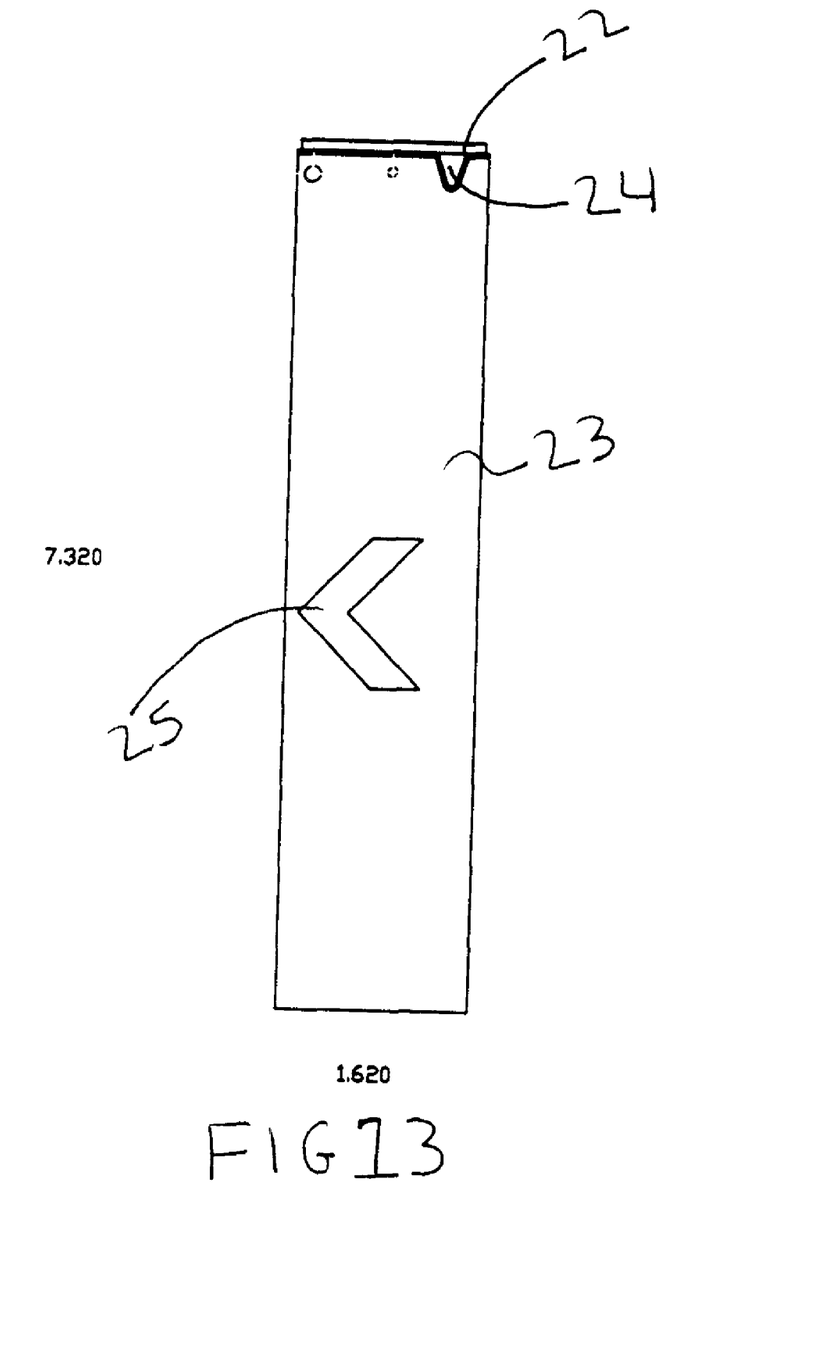
FIG. 13 is a side view of the chevron inserts of the present invention.

As can be seen in FIG. 13, notch 24 and shoulder 22 are formed along the top edge of the chevron insert 23. A similar notch is formed on the opposite side of the chevron insert such that the insert may be rotated and installed in opposite fashion and maintained in secure relationship within gap 21. Thus, a first and a second notch may be provided depending from each side of the insert 23 from shoulder 22, one along the right side and another on the opposing left side, for example.

Figure 14:
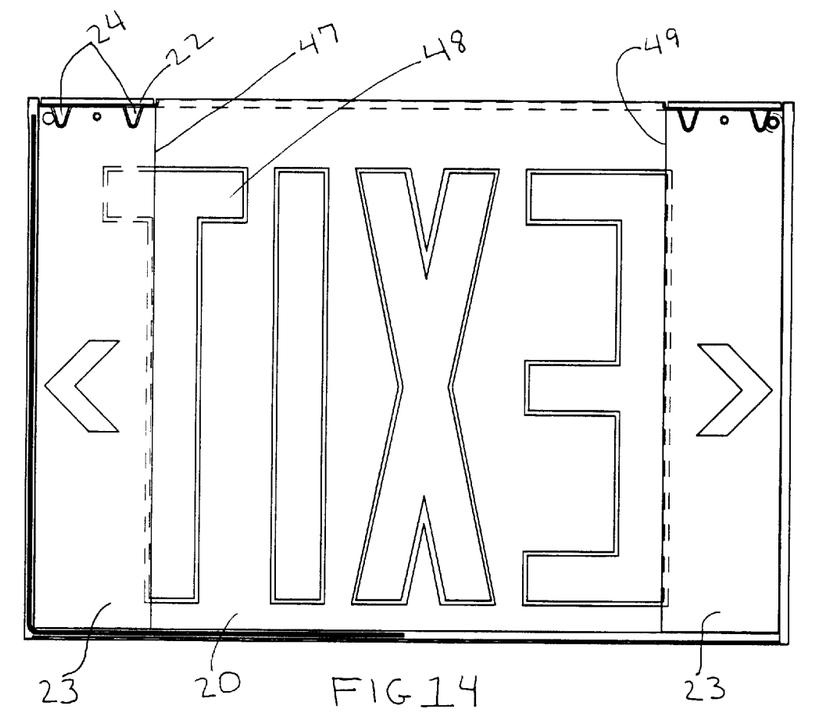
FIG. 14 is a side view of the lens of the present invention with the chevrons inserted.

As shown in FIG. 14, after insertion of the chevron inserts 23 into the gap 21 of sign or lens 20, a joiner line 47 and 49 may be apparent. However, these joiner lines may be hidden by the indicia or other lettering 48 formed on the lens. Thus, only an upper or lower small portion of the joiner line may be visible to the user after insertion of the chevron inserts. As shown in FIG. 14, the lens 20 is sufficiently clear such that either side of the lens is visible and the indicia 48 is seen only on a single side. Further, the notches 24 are apparent on both the front and the back surface of the insert 23 and depending below shoulder 22.

Figure 15:
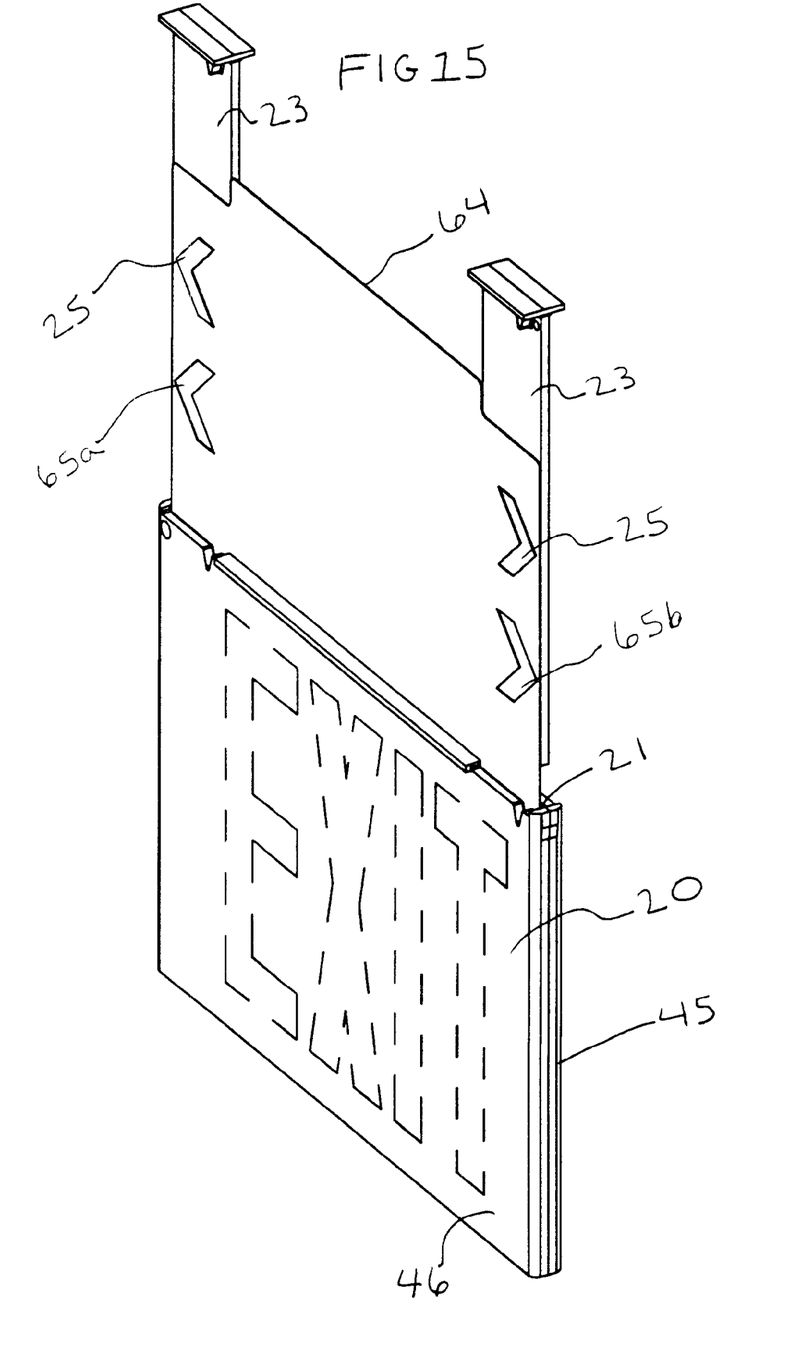
FIG. 15 is an upper perspective view of the sign of the present invention with the chevrons installed and with a background insert installed therein.

Turning to FIG. 15, the chevron inserts 23 are depicted with chevrons 25 formed thereon and are partially inserted into gap 21 of the lens 20. Additionally, as may be desired indicia may necessarily be required on both the front and back lens 46 and 45. As the lens 20 depicted herein may be constructed of optically clear material having a high percentage of light transmittance, light indicia on both the front and back surfaces may be troublesome without an opaque material located therebetween. Thus, a background insert 64 may be inserted into the gap 21 in between the front and back lenss 46 and 45 in order to prevent a viewer from seeing the indicia on both the front and back lens portions. As depicted in FIG. 15, a background insert 64 which may be made of an opaque material may have cut outs 65a and 65b which correspond to markings found on the chevron inserts 23, such markings being the chevrons 25 in this example. Alternatively, the background insert 64 may extend only partially across the extent of the lens 20 in order to cover only the corresponding equivalent surface area of the front and back lens elements 46 and 45 which have indicia thereon. In such an instance, cut outs may not therefore be necessary.

The background insert 64 may be a decorative mirror or white background construction and may be approximately 0.010 inches thick. The background insert 64 may be a laminate material of either white polyester and silver polyester combined. It is thus desirable therefore to have a background insert which prevents luminescence and viewing of either side but which allows proper illumination by the LED lightbar of the entire lens 20. Cutouts 65a and 65b may necessarily therefore be supplied with desired directional chevron cutouts 65a and 65b located thereon. Thus, a number of background inserts maybe utilized with no cutouts, right or left cutouts or other combinations if the background insert 64 and lens 20 of the present invention is to be utilized with chevrons and exit signage. It is also noted that the background insert 64 may be used if a double-faced sign is to be installed where the indicia is visible on both sides of the lens 20. Thus, an opposing background insert on the opposite side of the chevron inserts 23 may be utilized and will therefore separate both front and back lens 46 and 45.

Figure 16:
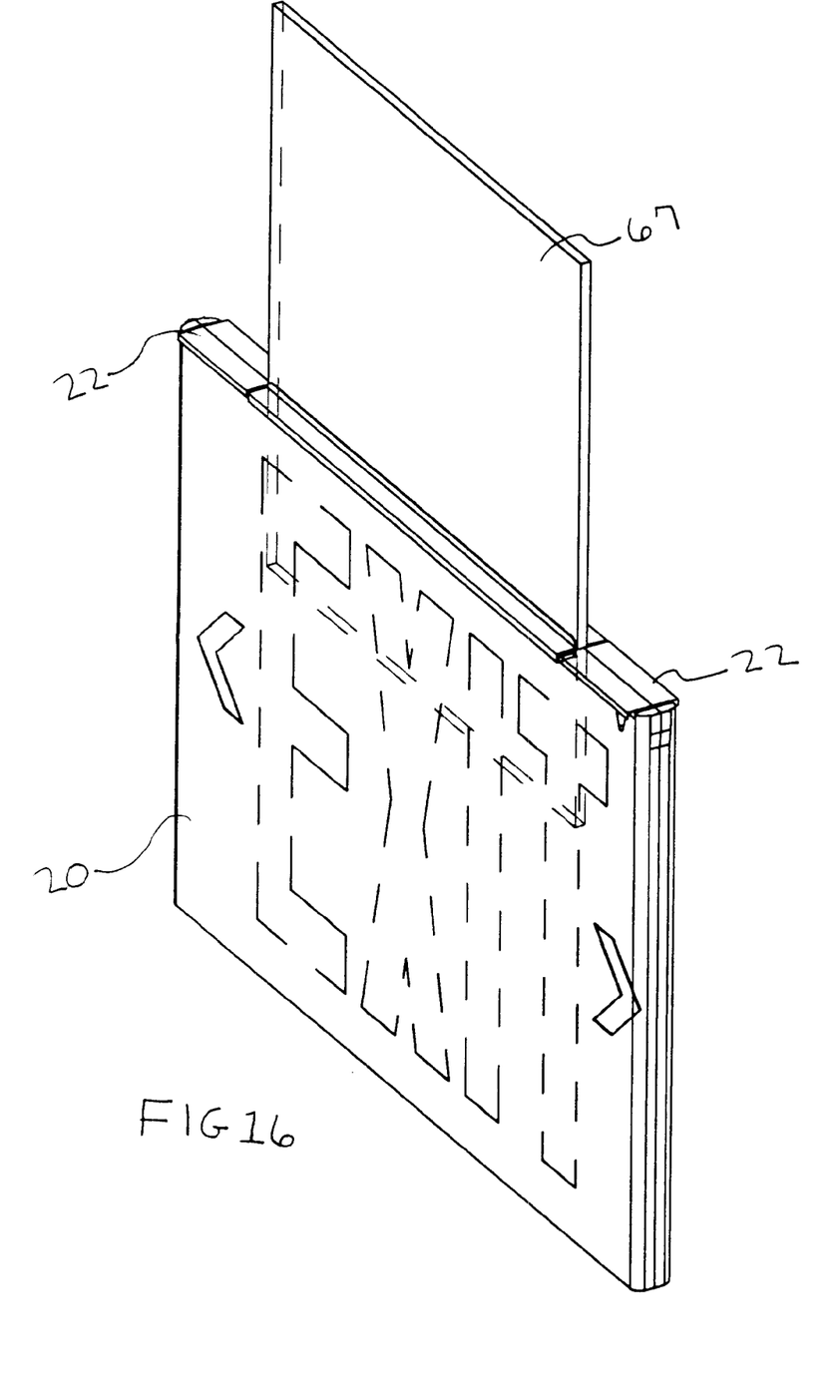
FIG. 16 is an upper perspective view of the edgelit sign of the present invention wherein the lens has a spacer located therein.

Additionally, as is shown in FIG. 16, a spacer block 67 may be desired so that the background insert 64 properly presses up against the inside surface of the lens 20. Such an insert spacer 67 will prevent double imaging when using the silver side of the background inserts 64 and also prevents color bleeding or other undesirable lumination characteristics. The spacer 67 additionally allows the LED lightbar to properly illuminate both the front and back lens 46 and 45 while insuring the background insert 64 are properly pressed up against the interior side wall of the lens element. The construction of the spacer may be such that it readily fits within the preferred 0.160 inch wide pocket 21 formed between front and back lens elements 46 and 45 but which allows the background insert 64 and ready removal of the chevron inserts 23 therefrom.

The mounting plate 54 of the present invention in combination with the mounting housing assembly 50 allows the multi-position mount edgelit signage of the present invention to be back mounted, recessed back mounted, ceiling mounted and recess ceiling mounted, depending on the field mount characteristics required. Further, the lens 20 in combination with the LED lightbar and electronic assembly 58 may provide emergency operation such that the electronic assembly incorporates a battery thereon for emergency lighting. Thus, the signage may be properly illuminated by the plurality of LED's formed on the LED lightbar 34 for predefined period of time depending upon the battery utilized within the electronic assembly. Further, direct attachment of the LED lightbar and electronic assembly may be provided to an external power supply so that the light signs may be continually illuminated.

As depicted herein, the chevron inserts 23 depend into the interior of gap 21 and are held in place along the upper edge of the lens members. However, as may be readily apparent, one of ordinary skill in the art may take the disclosure herein and design inserts from any direction such that they are readily removable or installable depending upon field specified characteristics. These alternative insertion points for the chevron inserts may be positioned from the side, bottom or at an angle and may readily be removable.

The forgoing detailed description is primarily given for clearness of understanding and no unnecessary limitations are to be understood therefrom for modifications will become obvious to those skilled in the art upon reading this disclosure and may be made without the parting from the spirit of the invention or the scope of the appending claims.

What is claimed is:

1. A multi-positioned edgelit sign, comprising:

a mounting housing assembly;

an LED lightbar retainable within said mounting housing assembly in a plurality of positions;

a lens attachable to said mounting housing assembly and affixed thereon, said plurality of positions being at least a first position and a second position.

2. The multi-position edgelit sign of claim 1 further comprising a lens housing assembly retaining said lens, said lens housing assembly removably affixable to said mounting housing assembly.

3. The multi-position edgelit sign of claim 2 wherein said lens is retained within said lens housing assembly and has a top edge which is maintained in adjacent relationship with said LED lightbar.

4. The multi-position edgelit sign of claim 3 wherein said mounting housing assembly has at least one mounting bracket, said mounting bracket of said mounting housing assembly retaining said LED lightbar.

5. The multi-position edgelit sign of claim 4 wherein said mounting bracket is comprised of a two position mounting bracket.

6. The multi-position edgelit sign of claim 5 wherein said two position mounting bracket is further comprised of a first mounting bracket and a second mounting bracket in opposing relationships, each of said two position mounting bracket having a first tab and a second tab in angular relationship with each other such that said LED lightbar may be secured thereon in more than one position.

7. The multi-position edgelit sign of claim 4 further comprising a beveled connecting edge between said mounting housing assembly and said lens housing assembly.

8. The multi-position edgelit sign of claim 7 wherein said mounting housing assembly has a substantially rectangular front surface and a first and second substantially triangular side surface;

said lens housing assembly having a substantially rectangular front rear surface and a substantially triangular first and second side surface, said beveled edge on said mounting housing assembly contacting said beveled edge on said lens housing assembly to removably attach said lens housing assembly to said mounting housing assembly.

9. The multi-position edgelit sign of claim 3 wherein said LED lightbar has a plurality of LED's extending therefrom.

10. The multi-position edgelit sign of claim 2 wherein said lens is further comprised of a front lens and a back lens forming a gap therebetween.

11. The multi-position edgelit sign of claim 10 further comprising at least one removable insert, said removable insert removably retained within said gap.

12. The multi-position edgelit sign of claim 11 wherein said removable insert is comprised of a shoulder portion and a depending planer portion, said depending planer portion extending within said gap.

13. The multi-position edgelit sign of claim 11 wherein said removable insert is comprised of a first removable insert and a second removable insert, each of said removable inserts having indicia formed thereon.

14. The multi-position edgelit sign of claim 12 wherein said removable insert further has a notch adjacent said shoulder, said lens further comprising a corresponding recess to receive said notch of said removable insert.

15. The multi-position edgelit sign of claim 11 wherein said removable insert is slideably removable within said gap and removably retained therein.

16. The multi-position edgelit sign of claim 12 fuirther comprising a background insert extending between an interior surface of said lens and said insert and wherein an insert spacer is provided within said gap to press said background insert against said inside surface.

17. A multi-position edgelit sign comprisin: mounting housing assembly;

an LED lightbar mounted within said mounting housing assembly;

an edgelit sign having an edge adjacent to said LED lightbar;

wherein said edgelit sign may be mounted adjacent said LED hghtbar at a plurality of angles relative to said mounting housing assembly, said plurality of angles being at least a first angle and a second angle relative to said mounting housing assembly.

18. The multi-position edgelit sign of claim 17 further comprising a lens housing assembly, said lens housing assembly retaining said edgelit sign and removably attached to said mounting housing assembly at said plurality of angles relative to said mounting housing assembly.

19. The multi-position edgelit sign of claim 18 wherein said lens housing assembly has a longitudal aperture therein, said longitudal aperture receiving said edgelit sign therethrough and retaining said edgelit sign within said lens housing assembly.

20. The multi-position edgelit sign of claim 18 wherein said mounting housing assembly further comprises at least one multi-position mounting bracket for receiving said LED lightbar.

21. The multi-position edgelit sign of claim 20 wherein said at least one multi-position mounting bracket is a first mounting bracket and a second mounting bracket said first and said second mounting brackets removable retaining said LED lightbar within said mounting housing assembly.

22. The multi-position edgelit sign of claim 21 wherein each of said first and said second mounting bracket has a first retention tab and a second retention tab.

23. The multi-position edgelit sign of claim 18 wherein said mounting housing assembly is flrther comprise of a plurality of retaining clips, a first and a second beveled contacting edge, and further wherein said lens housing assembly is further comprised of a plurality of retaining clips and a first and a second beveled contacting edge, said first and said second contacting edge of said lens housing assembly mating with said first and said second beveled contacting edge of said mounting housing assembly and further wherein said plurality of retaining clips on said mounting housing assembly mate with said plurality of retaining clips on said lens housing assembly.

24. The multi-position edgelit sign of claim 18 wherein said LED lightbar has a plurality of LED's locateable thereon.

25. The multi-position edgelit sign of claim 24 wherein said plurality of LED's are maintained in adjacent relationship with said edge of said edgelit sign.

26. The multi-position edgelit sign of claim 24 wherein said LED lightbar is further comprised of a power cord and further wherein said mounting housing assembly has an electronics assembly mounted thereon, said LED lightbar electrically connected to said electronics assembly through said power cord.

27. The multi-position edgelit sign of claim 18 wherein said edgelit sign is further comprised of a front lens and a back lens forming a gap therebetween, said gap removably receiving indicia inserts therein.

28. The multi-position edgelit sign of claim 27 wherein said indicia inserts are rectangular inserts having a shoulder portion and a depending planer portion, said depending planer portion received within said gap.

29. The multi-position edgelit sign of claim 28 wherein said indicia inserts are comprised of a first insert and a second insert, said first insert received along a first side of said sign, said second insert received along a second opposing side of said sign, both of said inserts received within said gap.

30. An edgelit sign, comprising:
a front lens; a back lens, a gap therebetween, and at least one insert removably received within said gap, said front lens and back lens retained together in adjacent relationship;
wherein said front lens and said back lens both have a top edge said top edge separated by said gap and removably receiving said at least one insert;
wherein said at least one insert is comprised of a shoulder portion and a depending planer portion, said depending planer portion received within said gap between said front lens and said back lens.

31. An edgelit sign, comprising:
a front lens, a back lens, a gap therebetween, and at least one insert removably received within said gap, said front lens and back lens retained together in adjacent relationship;
wherein said front lens and said back lens both have a top edge said top edge separated by said gap and removably receiving said at least one insert;
further comprising at least one recess formed in said front lens, at least one notch formed along said shoulder of said insert, said at least one notch received within said at least one recess on said front lens.

32. An edgelit sign, comprising;
a front lens, a back lens, a gap therebetween, and at least one insert removably received within said gap, said front lens and back lens retained together in adjacent relationship;
wherein said front lens and said back lens both have a top edge said top edge separated by said gap and removably receiving said at least one insert;
wherein said top edge of said front lens and said back lens has a ledge formed thereon, said insert having a shoulder portion and a depending planer portion, said depending planer portion received within said gap and said shoulder portion mating against an edge end of said ledge of said front lens and said back lens.

* * * * *